(12) United States Patent
Bivolarsky et al.

(10) Patent No.: US 11,604,294 B2
(45) Date of Patent: Mar. 14, 2023

(54) DETERMINING LAYER CHARACTERISTICS IN MULTI-LAYERED ENVIRONMENTS

(71) Applicant: PERCEPTIVE SENSOR TECHNOLOGIES, INC., Tucson, AZ (US)

(72) Inventors: Lazar Bivolarsky, Cupertino, CA (US); Joel D. Burcham, Huntsville, AL (US); William Coleman, Tucson, AZ (US); James M. Heim, Tucson, AZ (US)

(73) Assignee: PERCEPTIVE SENSOR TECHNOLOGIES, INC., Tucson, AZ (US)

( * ) Notice: Subject to any disclaimer, the term of this patent is extended or adjusted under 35 U.S.C. 154(b) by 0 days.

(21) Appl. No.: 17/746,622

(22) Filed: May 17, 2022

(65) Prior Publication Data

US 2022/0276398 A1 Sep. 1, 2022

Related U.S. Application Data

(63) Continuation-in-part of application No. 17/543,152, filed on Dec. 6, 2021.
(Continued)

(51) Int. Cl.
*G01K 1/00* (2006.01)
*G01V 1/00* (2006.01)
(Continued)

(52) U.S. Cl.
CPC ............ *G01V 1/001* (2013.01); *G01B 17/02* (2013.01); *G01K 11/24* (2013.01); *G01K 13/10* (2013.01)

(58) Field of Classification Search
CPC combination set(s) only.
See application file for complete search history.

(56) References Cited

U.S. PATENT DOCUMENTS 2,449,054 A 9/1948 Chantlin .................. 177/311
3,019,650 A 2/1962 Worswick .................. 73/290
(Continued)

FOREIGN PATENT DOCUMENTS

CN 105548370 5/2016 ............. G01N 29/24
DE 10 2010 029 254 12/2011 ............... F01N 3/10
(Continued)

OTHER PUBLICATIONS

Amjad, Umar et al, "Advanced signal processing technique for damage detection in steel tubes" Proceedings of SPIE, Health Monitoring of Structueral and Biological Systems 2016, 980511 (Apr. 1, 2016); 14 pgs.
(Continued)

*Primary Examiner* — Lisa M Caputo
*Assistant Examiner* — Nasir U. Ahmed
(74) *Attorney, Agent, or Firm* — Hayes Soloway P.C.

(57) ABSTRACT

A system for measuring a number of layers in a layered environment includes an ultrasound transducer positioned at an exterior surface of a first layer at a first location. At least one receiving sensor is positioned perpendicular to the exterior surface of the first layer at a second location. The ultrasound transducer and the at least one receiving sensor are in communication with a computer processor, power source, and computer-readable memory. The ultrasound transducer is configured to emit a first ultrasound signal into the first layer at the first location. The at least one receiving sensor is configured to receive a plurality of propagated ultrasound signals. The processor is configured to determine a total number of layers in the layered environment based on at least one from the set of: a number of signals received and a number of propagation direction changes only of the first ultrasound signal.

18 Claims, 8 Drawing Sheets

Related U.S. Application Data

(60) Provisional application No. 63/121,755, filed on Dec. 4, 2020.

(51) Int. Cl.
*G01K 11/24* (2006.01)
*G01K 13/10* (2006.01)
*G01B 17/02* (2006.01)

(56) References Cited

U.S. PATENT DOCUMENTS

| | | | |
|---|---|---|---|
| 3,703,829 A | 11/1972 | Dougherty | 73/290 |
| 3,837,218 A | 9/1974 | Flambard et al. | G01N 29/00 |
| 3,971,962 A * | 7/1976 | Green | G01H 3/125 |
| | | | 310/322 |
| 4,065,958 A | 1/1978 | Krylova et al. | G01N 29/02 |
| 4,118,983 A | 10/1978 | Braznikov | G01F 23/28 |
| 4,121,468 A | 10/1978 | Glover et al. | G01N 29/04 |
| 4,182,177 A | 1/1980 | Prough | 73/290 |
| 4,280,126 A | 7/1981 | White | 340/621 |
| 4,320,659 A | 3/1982 | Lynnworth et al. | G01N 29/02 |
| 4,501,146 A | 2/1985 | Greenhalgh | G01F 23/28 |
| 4,580,448 A | 4/1986 | Skrgatic | G01F 23/28 |
| 4,596,266 A | 6/1986 | Kinghom et al. | B65D 88/38 |
| 4,676,098 A | 6/1987 | Erlenkämper et al. | 73/290 |
| 4,852,416 A | 8/1989 | Boone et al. | H04R 1/02 |
| 4,934,191 A | 6/1990 | Kroening et al. | 73/592 |
| 4,954,997 A | 9/1990 | Dieulesaint et al. | G08B 21/00 |
| 4,977,780 A | 12/1990 | Machida et al. | G01N 29/04 |
| 5,015,995 A | 5/1991 | Holroyd | 340/621 |
| 5,038,611 A | 8/1991 | Weldon et al. | 73/290 |
| 5,148,700 A | 9/1992 | King | G01N 15/00 |
| 5,195,058 A | 3/1993 | Simon | G01S 15/02 |
| 5,295,120 A | 3/1994 | McShane | 367/188 |
| 5,325,727 A | 7/1994 | Miller et al. | G01F 1/34 |
| 5,415,033 A | 5/1995 | Maresca, Jr. et al. | 73/40.5 |
| 5,438,868 A | 8/1995 | Holden et al. | 73/290 |
| 5,460,046 A | 10/1995 | Maltby et al. | G01N 29/24 |
| 5,469,749 A | 11/1995 | Shimada et al. | G01F 1/38 |
| 5,604,314 A | 2/1997 | Grahn | G01L 5/16 |
| 5,770,806 A | 6/1998 | Hiismaki | G01F 1/662 |
| 5,821,427 A | 10/1998 | Byrd | G01F 1/66 |
| 6,035,903 A | 3/2000 | Few et al. | B65B 1/04 |
| 6,151,956 A | 11/2000 | Takahashi et al. | G01N 3/56 |
| 6,157,894 A | 12/2000 | Hess et al. | 702/54 |
| 6,192,751 B1 | 2/2001 | Stein et al. | G08B 21/00 |
| 6,330,831 B1 | 12/2001 | Lynnworth et al. | 73/861.28 |
| 6,368,281 B1 | 4/2002 | Solomon et al. | A61B 8/14 |
| 6,443,006 B1 | 9/2002 | Degrave | G02F 23/00 |
| 6,470,744 B1 | 10/2002 | Usui et al. | 73/290 |
| 6,481,287 B1 | 11/2002 | Ashworth et al. | G01K 11/24 |
| 6,513,385 B1 | 2/2003 | Han | G01N 29/00 |
| 6,575,043 B1 | 6/2003 | Huang et al. | G01F 1/66 |
| 6,578,424 B1 | 6/2003 | Ziola et al. | G01N 29/00 |
| 6,631,639 B1 | 10/2003 | Dam et al. | 73/290 |
| 6,672,163 B2 | 1/2004 | Han et al. | G01V 1/28 |
| 6,925,868 B2 | 8/2005 | Young et al. | 73/290 |
| 6,938,488 B2 | 9/2005 | Diaz et al. | 73/597 |
| 7,085,391 B1 | 8/2006 | Yamava | G10H 1/00 |
| 7,114,375 B2 | 10/2006 | Panetta et al. | 73/61.75 |
| 7,246,522 B1 | 7/2007 | Diaz et al. | 73/597 |
| 7,299,136 B2 | 11/2007 | DiFoggio et al. | 702/22 |
| 7,330,797 B2 | 2/2008 | Bailey et al. | G01F 23/00 |
| 7,363,174 B2 | 4/2008 | Kishiro et al. | G01F 25/10 |
| 7,624,650 B2 | 12/2009 | Gysling et al. | G01F 1/66 |
| 7,624,651 B2 | 12/2009 | Fernald et al. | G01F 1/66 |
| 7,656,747 B2 | 2/2010 | Mandal et al. | G01V 1/44 |
| 7,694,570 B1 | 4/2010 | Dam et al. | 73/644 |
| 7,962,293 B2 | 6/2011 | Gysling | G01F 1/76 |
| 7,966,882 B2 | 6/2011 | Greenwood | 73/597 |
| 8,249,829 B2 | 8/2012 | Vass et al. | G06F 19/00 |
| 8,683,882 B2 | 4/2014 | Jackson | G01N 9/24 |
| 8,820,182 B2 | 9/2014 | Nikolay Nikolov et al. | |
| | | | H04Q 9/00 |
| 8,850,882 B2 | 10/2014 | Qu et al. | G01F 23/296 |
| 8,915,145 B1 | 12/2014 | Van Orsdol | G01F 1/74 |
| 9,057,677 B2 | 6/2015 | Field | G01N 29/032 |
| 9,557,208 B2 | 1/2017 | Kuroda et al. | G01F 23/28 |
| 9,891,085 B2 | 2/2018 | Muhammad et al. | G01F 1/88 |
| 10,122,051 B2 | 11/2018 | Kuhne et al. | H01M 10/484 |
| 10,458,871 B2 | 10/2019 | Norli | G01L 11/04 |
| 10,794,871 B1 | 10/2020 | Blackshire et al. | G01N 29/265 |
| 11,020,793 B2 | 6/2021 | De Monte et al. | B22D 2/006 |
| 2002/0170753 A1 | 11/2002 | Clare | G01G 19/22 |
| 2004/0079150 A1 | 4/2004 | Breed et al. | 73/291 |
| 2004/0173021 A1 | 9/2004 | Lizon et al. | 73/290 |
| 2004/0226615 A1 | 11/2004 | Morikawa et al. | G05D 7/06 |
| 2005/0055136 A1 | 3/2005 | Hofmann et al. | 700/273 |
| 2005/0128873 A1 | 6/2005 | LaBry | G01V 1/40 |
| 2005/0178198 A1 | 8/2005 | Freger et al. | 73/290 |
| 2005/0247070 A1 | 11/2005 | Arshansky et al. | 62/77 |
| 2006/0196224 A1 | 9/2006 | Esslinger | 62/509 |
| 2007/0068253 A1 | 3/2007 | Carodiskey | A61B 6/00 |
| 2007/0157737 A1 | 7/2007 | Gysling et al. | G01F 1/667 |
| 2007/0205907 A1 | 9/2007 | Schenk | G08B 21/00 |
| 2008/0092623 A1 | 4/2008 | Lynch et al. | G01N 29/02 |
| 2008/0101158 A1 | 5/2008 | Hosseini et al. | G01S 15/00 |
| 2009/0143681 A1 | 6/2009 | Jurvelin et al. | A61B 8/00 |
| 2010/0111133 A1* | 5/2010 | Yuhas | G01K 17/00 |
| | | | 374/30 |
| 2010/0199779 A1 | 8/2010 | Liu et al. | G01F 1/663 |
| 2010/0242593 A1 | 9/2010 | Lagergren et al. | G01F 23/296 |
| 2011/0029262 A1 | 2/2011 | Barkhouse | 702/55 |
| 2011/0072904 A1 | 3/2011 | Lam et al. | G01N 29/04 |
| 2011/0120218 A1 | 5/2011 | Aldridge | 73/290 |
| 2011/0239769 A1 | 10/2011 | Schmitt et al. | G01N 29/02 |
| 2011/0271769 A1 | 11/2011 | Kippersund et al. | G01F 1/66 |
| 2011/0284288 A1 | 11/2011 | Sawyer et al. | E21B 49/005 |
| 2012/0024067 A1 | 2/2012 | Oberdoerfer et al. | G01N 29/00 |
| 2012/0055239 A1 | 3/2012 | Sinha | G01N 29/00 |
| 2012/0259560 A1 | 10/2012 | Woltring et al. | 702/55 |
| 2012/0262472 A1 | 10/2012 | Garr et al. | G06T 11/206 |
| 2012/0281096 A1 | 11/2012 | Gellaboina et al. | G01S 15/89 |
| 2013/0002443 A1 | 1/2013 | Breed et al. | G08B 21/00 |
| 2013/0068027 A1* | 3/2013 | Sullivan | G01N 29/07 |
| | | | 702/56 |
| 2013/0080081 A1 | 3/2013 | Dugger et al. | G01F 1/663 |
| 2013/0090575 A1 | 4/2013 | Rupp et al. | A61N 7/00 |
| 2013/0120155 A1 | 5/2013 | Hagg | G08C 19/16 |
| 2013/0128035 A1 | 5/2013 | Johns et al. | 348/135 |
| 2013/0213714 A1 | 8/2013 | Fuida | E21B 49/00 |
| 2014/0020478 A1 | 1/2014 | Ao et al. | G01F 1/66 |
| 2014/0027455 A1 | 1/2014 | Castellano et al. | B65D 88/34 |
| 2014/0076415 A1 | 3/2014 | Dunki-Jacobs et al. | E03C 1/02 |
| 2014/0107435 A1 | 4/2014 | Sharf et al. | A61B 8/00 |
| 2014/0223992 A1 | 8/2014 | Harper et al. | G01F 25/0084 |
| 2014/0301902 A1 | 10/2014 | Fernald et al. | B01J 19/10 |
| 2014/0375169 A1 | 12/2014 | Na et al. | H01L 41/08 |
| 2015/0075278 A1 | 3/2015 | Dockendorff et al. | |
| | | | G01F 23/296 |
| 2015/0212045 A1 | 7/2015 | Raykhman et al. | G01F 1/74 |
| 2015/0247751 A1 | 9/2015 | Kutlik et al. | G01F 23/2962 |
| 2015/0260003 A1 | 9/2015 | McHugh et al. | E21B 33/076 |
| 2015/0276463 A1 | 10/2015 | Milne et al. | G01F 23/296 |
| 2015/0369647 A1 | 12/2015 | Kumar et al. | G01F 23/284 |
| 2016/0025545 A1 | 1/2016 | Saltzgiver et al. | G01F 23/263 |
| 2016/0041024 A1 | 2/2016 | Reimer et al. | G01F 23/296 |
| 2016/0108730 A1 | 4/2016 | Fanini et al. | E21B 49/08 |
| 2016/0146653 A1 | 5/2016 | Skelding | E21B 21/01 |
| 2016/0169839 A1 | 6/2016 | Gottlieb et al. | G01N 29/02 |
| 2016/0216141 A1 | 7/2016 | Leaders et al. | G01F 1/66 |
| 2016/0320226 A1 | 11/2016 | Schaefer et al. | G01F 23/296 |
| 2017/0002954 A1 | 1/2017 | Brown et al. | F16K 37/0058 |
| 2017/0010144 A1 | 1/2017 | Lenner et al. | G01F 23/296 |
| 2017/0010145 A1 | 1/2017 | Lenner et al. | G01F 23/2962 |
| 2017/0010146 A1 | 1/2017 | Kassubek et al. | G01F 23/2962 |
| 2017/0059389 A1 | 3/2017 | Moore et al. | G01F 23/2968 |
| 2017/0082650 A1 | 3/2017 | Hies et al. | G01F 25/0007 |
| 2017/0087526 A1 | 3/2017 | Luharuka | B01F 15/00 |
| 2017/0102095 A1 | 4/2017 | Kunita et al. | F16K 37/0091 |
| 2017/0097322 A1 | 6/2017 | Giese et al. | G01N 29/07 |
| 2017/0199295 A1 | 7/2017 | Mandal | G01V 1/50 |
| 2017/0202595 A1 | 7/2017 | Shelton, IV | A61B 18/00 |

(56) References Cited

U.S. PATENT DOCUMENTS

| | | | |
|---|---|---|---|
| 2017/0239741 A1 | 8/2017 | Furuta | B23H 1/10 |
| 2017/0268915 A1 | 9/2017 | Gestner et al. | G01F 1/66 |
| 2017/0309989 A1 | 10/2017 | Waelde et al. | H01Q 1/225 |
| 2018/0035603 A1 | 2/2018 | Kremmer et al. | A01C 7/20 |
| 2018/0044159 A1 | 2/2018 | Crouse et al. | B67D 1/0406 |
| 2018/0080809 A1 | 3/2018 | Tokarev et al. | G01F 23/2965 |
| 2018/0149505 A1 | 5/2018 | Ploss et al. | G01F 1/66 |
| 2018/0266874 A1 | 9/2018 | Montoya et al. | G01F 23/68 |
| 2018/0299317 A1 | 10/2018 | Truong et al. | G01F 23/2925 |
| 2018/0306628 A1 | 10/2018 | Parrott et al. | G01F 17/00 |
| 2018/0348169 A1 | 12/2018 | Lee et al. | G01N 29/11 |
| 2019/0011304 A1 | 1/2019 | Cunningham et al. | G01F 17/00 |
| 2019/0063984 A1 | 2/2019 | Bowley | G01F 23/2965 |
| 2019/0078927 A1 | 3/2019 | Takayama et al. | G01F 23/2965 |
| 2019/0137310 A1* | 5/2019 | Xiao | G01F 1/662 |
| 2019/0195629 A1 | 6/2019 | Vaissiere | G01C 9/00 |
| 2019/0195830 A1 | 6/2019 | Tamura et al. | G01N 29/07 |
| 2019/0272496 A1 | 9/2019 | Moeller | G06Q 10/087 |
| 2020/0018628 A1 | 1/2020 | Head et al. | G21C 17/022 |
| 2020/0182736 A1 | 6/2020 | Kim et al. | G01M 3/2807 |
| 2020/0378283 A1 | 12/2020 | Zhang et al. | F01M 11/10 |
| 2020/0378812 A1 | 12/2020 | Heim | G01F 1/667 |
| 2020/0378818 A1 | 12/2020 | Heim et al. | G01F 23/296 |
| 2021/0382014 A1 | 12/2021 | Xu et al. | G01N 29/24 |
| 2022/0178879 A1 | 6/2022 | Bivolarsky et al. | G02N 29/028 |
| 2022/0178881 A1 | 6/2022 | Bivolarsky et al. | G01N 29/04 |

FOREIGN PATENT DOCUMENTS

| | | | |
|---|---|---|---|
| EP | 2450701 | 5/2012 | G01N 29/22 |
| EP | 2962096 | 8/2019 | G01L 1/255 |
| GB | 2192717 | 1/1990 | G01N 29/00 |
| KR | 200174618 | 3/2000 | G01N 29/24 |
| SU | WO 87/04793 | 8/1987 | G01N 29/00 |
| WO | WO 8809895 | 12/1988 | F16K 37/00 |
| WO | WO 2007/149605 | 12/2007 | |
| WO | WO 2014/167471 | 10/2014 | G01F 23/30 |
| WO | WO 2020/136945 | 7/2020 | G01F 23/296 |

OTHER PUBLICATIONS

Amjad, Umar et al. "Change in time-of-flight of longitudunal (axisymmetric) wave modes due to lamination in steel pipes" Proceedings of SPIE vol. 8695, Health Monitoring of Structural and Biological Systems 2013, 869515 (Apr. 17, 2013); 10 pgs.

Amjad, Umar et al., "Effects of transducters on guided wave based structural health monitoring" Proceedings of SPIE, vol. 10600, Health Monitoring of Structural and Biological Systems XII, 106000F (Apr. 23, 2018), 10 pgs.

Amjad, U. et al., "Generalized representations and universal aspects of Lamb wave dispersion relations" Proceedings of SPIE, vol. 7650, Health Monitoring of Structural and Biological Systems 2010, 76502F (Apr. 8, 2010), 9 pgs.

Amjad, Umar et al., "Detection and quantification of pipe damage from change in time of flight and phase" Ultrasoncis vol. 62 (2015) pp. 223-236, Jun. 11, 2015, 14 pgs.

Amjad, Umar et al., "Detection and quantification of diameter reduction due to corrosion in reinforcing steel bars" Structural Health Monitoring 2015, vol. 14(5) 532-543, 12 pgs.

Amjad, Umar et al., "Detection and quantification of delamination in laminated plates from the phase of appropriate guided wave modes" Optical Engineering 55(1), Jan. 2016, 11 pgs.

API: American Petroleum Institute Preliminary Program, Oct. 16-17, 2019, 5 pages.

Gurkov, Andrey "Gigantic Druzhba oil pipeline paralyzed for weeks" May 7, 2019, 3 pages, https://www.dw.com/en/gigantic-druzhba-oil-pipeline-paralyzed-for-weeks/a-48638989.

Hassanzadeh et al., "Investigation of factors affecting on viscosity reduction of sludge from Iranian crude oil storage tanks", Petroleum Science, vol. 15, Jul. 2018, pp. 634-643.

Kak et al., "Principles of Computerized Tomographic Imaging", IEEE, 1988, Chapter 2, 48 pgs.

Luck, Marissa "Deer Park fire a 'blemish' for the petrochemical industry's image" Houston Chronicle, Mar. 26, 2019, 3 pages https://www.houstonchronicle.com/business/energy/article/Deer-Park-fire-a-blemish-for-the-image-of-13717661.php.

Pandey, "Ultrasonic attenuation in condensed matter", Dissertation for V.B.S. Purvanchal University, 2009, Chapter 1, 36 pgs.

Pluta et al., "Stress Dependent Dispersion Relations of Acoustic Waves Travelling on a Chain of Point Masses Connected by Anharmonic Linear and Torsional Springs" International Congress on Ultrasonics AIP Conf. Proc. 1433, 471-474 (2012); 5 pgs.

Shelke, et al., "Mode-Selective Excitation and Detection of Ultrasonic Guided Waves for Delamination Detection in Laminated Aluminum Plates" IEEE Transactions on Ultrasonics, Ferroelectrics, and Frequency Control, vol. 58, No. 3, Mar. 2011, 11 pgs.

"TOPS Terminal Operating Practices Symposium" Program Agenda, Apr. 11, 2018, 1 page.

Zadler, et al., "Resonant Ultrasound Spectroscopy: theory and application", Geophysical Journal International, vol. 156, Issue 1, Jan. 2004, pp. 154-169.

Vermeersch, "Influence of substrate thickness on thermal impedance of microelectronic structures" Microelectonics Reliability, 47, 2007, pp. 437-443.

Examination Report No. 1 issued in Australian Application No. 2020283140 dated Jan. 4, 2022, 6 pgs.

Examination Report No. 1 issued in Australian Patent Application No. 2020302919, dated Feb. 15, 2022, 4 pgs.

International Search Report and Written Opinion issued in PCT/US20/35404, dated Aug. 24, 2020, 11 pages.

International Preliminary Report on Patentability issued in PCT/US20/35404 dated Nov. 16, 2021, 8 pgs.

International Search Report and Written Opinion issued in PCT/US20/39966, dated Sep. 18, 2020, 13 pages.

International Preliminary Report on Patentability issued in PCT/US20/39966 dated Dec. 28, 2021, 10 pgs.

International Search Report and Written Opinion issued in PCT/US21/61962 dated Feb. 16, 2022, 9 pgs.

International Search Report and Written Opinion issued in PCT/US21/61924 dated Feb. 16, 2022, 9 pgs.

International Search Report and Written Opinion issued in PCT/US21/62010 dated Feb. 16, 2022, 9 pgs.

International Search Report and Written Opinion issued in PCT/US21/61970 dated Feb. 18, 2022, 17 pgs.

International Search Report and Written Opinion issued in PCT/US21/61925 dated Feb. 18, 2022, 9 pgs.

International Search Report and Written Opinion issued in PCT/US21/61646 dated Feb. 25, 2022, 9 pgs.

International Search Report and Written Opinion issued in PCT/US21/65664 dated Mar. 11, 2022, 9 pgs.

International Search Report and Written Opinion issued in PCT/US21/62001 dated Mar. 9, 2022, 9 pgs.

International Search Report and Written Opinion issued in PCT/US21/61926 dated Mar. 8, 2022, 9 pgs.

Notice of Allowance issued in U.S. Appl. No. 16/888,469, dated Dec. 23, 2020, 16 pgs.

Notice of Allowance issued in U.S. Appl. No. 17/148,122 dated Jun. 16, 2021, 8 pgs.

Notice of Allowance issued in U.S. Appl. No. 16/914,092 dated Oct. 28, 2021, 14 pgs.

Notice of Acceptance issued in Australian Application No. 2020302919 dated Mar. 2, 2022, 4 pgs.

Notice of Acceptance issued in Australian Application No. 2020283140 dated Mar. 30, 2022, 4 pgs.

Notice of Allowance issued in Canadian Application No. 3,140,008 dated May 5, 2022, 1 pg.

Office Action issued in Australian Patent Application No. 2020283140, dated Mar. 18, 2022, 5 pgs.

Office Action issued in Canadian Patent Application No. 3,140,008, dated Feb. 14, 2022, 4 pgs.

Office Action issued in U.S. Appl. No. 16/888,469, dated Aug. 5, 2020, 8 pages.

(56) References Cited

OTHER PUBLICATIONS

Office Action issued in U.S. Appl. No. 16/888,469, dated Sep. 8, 2020, 20 pages.
Office Action issued in U.S. Appl. No. 16/914,092, dated Nov. 10, 2020, 22 pgs.
Office Action issued in U.S. Appl. No. 16/914,092, dated Mar. 1, 2021, 25 pgs.
Office Action issued in U.S. Appl. No. 16/914,092, dated Jun. 24, 2021, 24 pgs.
Office Action issued in U.S. Appl. No. 17/148,122, dated Mar. 2, 2021, 26 pgs.
Office Action issued in U.S. Appl. No. 17/543,200, dated Mar. 9, 2022, 8 pages.
Office Action issued in U.S. Appl. No. 17/542,465, dated Mar. 11, 2022, 22 pages.
Office Action issued in U.S. Appl. No. 17/542,461, dated Mar. 10, 2022, 18 pages.
Office Action issued in U.S. Appl. No. 17/542,872, dated Mar. 17, 2022, 22 pages.
Office Action issued in U.S. Appl. No. 17/566,020, dated Mar. 18, 2022, 20 pages.
Office Action issued in U.S. Appl. No. 17/541,036, dated Mar. 31, 2022, 22 pages.
Office Action issued in U.S. Appl. No. 17/543,152, dated Apr. 19, 2022, 17 pages.
Office Action issued in U.S. Appl. No. 17/542,814, dated Apr. 25, 2022, 21 pages.
U.S. Appl. No. 17/543,152, filed Dec. 6, 2021.
U.S. Appl. No. 17/540,021, filed Dec. 1, 2021, Heim et al.
U.S. Appl. No. 17/541,036, filed Dec. 2, 2021, Heim et al.
U.S. Appl. No. 17/543,152, filed Dec. 6, 2021, Bivolarsky et al.
U.S. Appl. No. 17/542,814, filed Dec. 6, 2021, Bivolarsky et al.
U.S. Appl. No. 17/542,461, filed Dec. 5, 2021, Burcham et al.
U.S. Appl. No. 17/542,465, filed Dec. 5, 2021, Bivolarsky et al.
U.S. Appl. No. 17/542,872, filed Dec. 6, 2021, Bivolarsky et al.
U.S. Appl. No. 17/542,200, filed Dec. 6, 2021, Bivolarsky et al.
U.S. Appl. No. 17/542,462, filed Dec. 5, 2021, Bivolarsky et al.
U.S. Appl. No. 17/566,020, filed Dec. 30, 2021, Bivolarsky et al.
U.S. Appl. No. 17/746,640, filed May 17, 2022, Bivolarsky et al.
Office Action issued in U.S. Appl. No. 17/542,462, dated May 27, 2022, 28 pages.
Office Action issued in U.S. Appl. No. 17/542,461, dated Jun. 27, 2022, 13 pages.
Office Action issued in U.S. Appl. No. 17/566,020, dated Jul. 12, 2022, 20 pages.
Office Action issued in U.S. Appl. No. 17/543,200, dated Jul. 20, 2022, 25 pages.
Office Action issued in U.S. Appl. No. 17/541,036, dated Aug. 9, 2022, 22 pages.
Office Action issued in U.S. Appl. No. 17/746,640, dated Aug. 18, 2022, 19 pages.
Notice of Allowance issued in U.S. Appl. No. 17/542,465, dated Jul. 11, 2022, 18 pages.
Notice of Allowance issued in U.S. Appl. No. 17/542,872, dated Jul. 11, 2022, 13 pages.
Notice of Allowance issued in Application Seria No. U.S. Appl. No. 17/543,152, dated Jul. 29, 2022, 16 pages.
Office Action issued in U.S. Appl. No. 17/542,814, dated Aug. 26, 2022, 22 pages.
Office Action issued in U.S. Appl. No. 17/540,021, dated Sep. 15, 2022, 40 pages.
Office Action issued in U.S. Appl. No. 17/542,462, dated Nov. 14, 2022, 11 pgs.
Office Action issued in U.S. Appl. No. 17/566,020, dated Nov. 14, 2022, 21 pgs.
Notice of Allowance issued in U.S. Appl. No. 17/542,461, dated Oct. 12, 2022, 9 pages.
Notice of Allowance issued in U.S. Appl. No. 17/543,200, dated Nov. 3, 2022, 16 pages.

\* cited by examiner

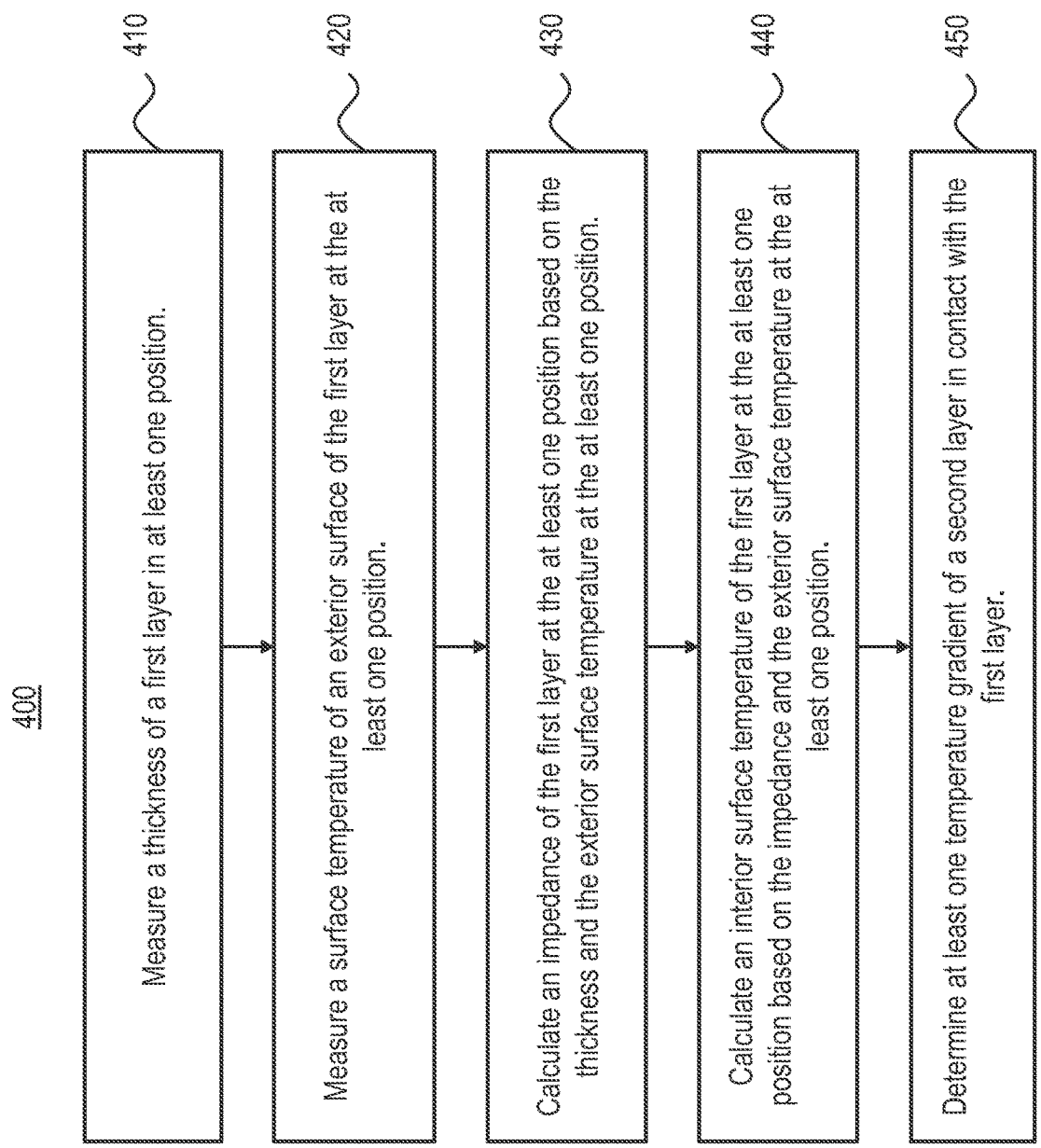

DETERMINING LAYER CHARACTERISTICS IN MULTI-LAYERED ENVIRONMENTS

CROSS REFERENCE TO RELATED APPLICATION

This application is a continuation-in-part of U.S. patent application Ser. No. 17/543,152 entitled, "Acoustic Temperature Measurement in Layered Environments" filed Dec. 6, 2021, which claims benefit of U.S. Provisional Application Ser. No. 63/121,755 filed Dec. 4, 2020, and titled "Acoustic Temperature Measurement in Layered Environments", the entire disclosures of which is incorporated herein by reference.

FIELD OF THE DISCLOSURE

The present disclosure is generally related to systems and methods for measuring temperature and more particularly is related to systems and methods for measuring temperature in layered environments.

BACKGROUND OF THE DISCLOSURE

Temperature measurement of a material is of paramount importance in determining other physical or any other properties of the material as well as in many processes. For materials enclosed within tubes, conduits, hoses, and other vessels, direct measurement of the temperature requires invasive measurement techniques, which cannot be performed without sensors located within the vessel. In many cases the temperature varies throughout the volume of the enclosure and creating accurate temperature measurement requires multiple invasive procedures which is not possible in uninterrupted processed and such measurement would interfere with process often rendering the measurement impossible.

Many investigators have looked at ways of measuring temperature non-invasively. Possible methods have included impedance tomography, microwave radiometry, and magnetic resonance imaging (MRI). MRI temperature imaging appears to have the required accuracy and spatial resolution for many thermal therapy scenarios, but it is expensive, requires a fixed installation and may be difficult to use. Nevertheless, at present MRI is the most advanced technology for non-invasive monitoring of thermal properties. However, MRI is not suitable for a number of industrial processes due to their configurations which include metal enclosures and pipelines that contain the material.

Furthermore, to measure the temperature in multi-layered environments, it is important to know the total number of layers so that the individual characteristics for each layer can be determined. In enclosed environments, the number of layers may be estimated based on the enclosure composition and the material composition. However, it is difficult to measure the number of layers without using invasive techniques or estimating based on composition.

Thus, a heretofore unaddressed need exists in the industry to address the aforementioned deficiencies and inadequacies.

SUMMARY OF THE DISCLOSURE

Embodiments of the present disclosure provide a system for measuring a number of layers in a layered environment. Briefly described, in architecture, one embodiment of the system, among others, can be implemented as follows. An ultrasound transducer positioned at an exterior surface of a first layer at a first location. At least one receiving sensor is positioned perpendicular to the exterior surface of the first layer at a second location. The ultrasound transducer and the at least one receiving sensor are in communication with a computer processor, power source, and computer-readable memory. The ultrasound transducer is configured to emit a first ultrasound signal into the first layer at the first location. The at least one receiving sensor is configured to receive a plurality of propagated ultrasound signals. The processor is configured to determine a total number of layers in the layered environment based on at least one from the set of: a number of signals received and a number of propagation direction changes only of the first ultrasound signal.

The present disclosure can also be viewed as providing methods of measuring layers in a layered environment. In this regard, one embodiment of such a method, among others, can be broadly summarized by the following steps: emitting, with an ultrasound transducer, a first ultrasound signal into a first layer at a first location, wherein a propagation direction of the first ultrasound signal is non-perpendicular to an exterior surface of the first layer; receiving, with at least one receiving sensor, a plurality of propagated ultrasound signals; and determining, with a processor in communication with the at least one receiving sensor, at least one from the set of: a number of signals received and a number of propagation direction changes only of the first ultrasound signal.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 4 is a flowchart illustrating a method of measuring a temperature in a layered environment, in accordance with the first exemplary embodiment of the present disclosure.

DETAILED DESCRIPTION

Figure 1:
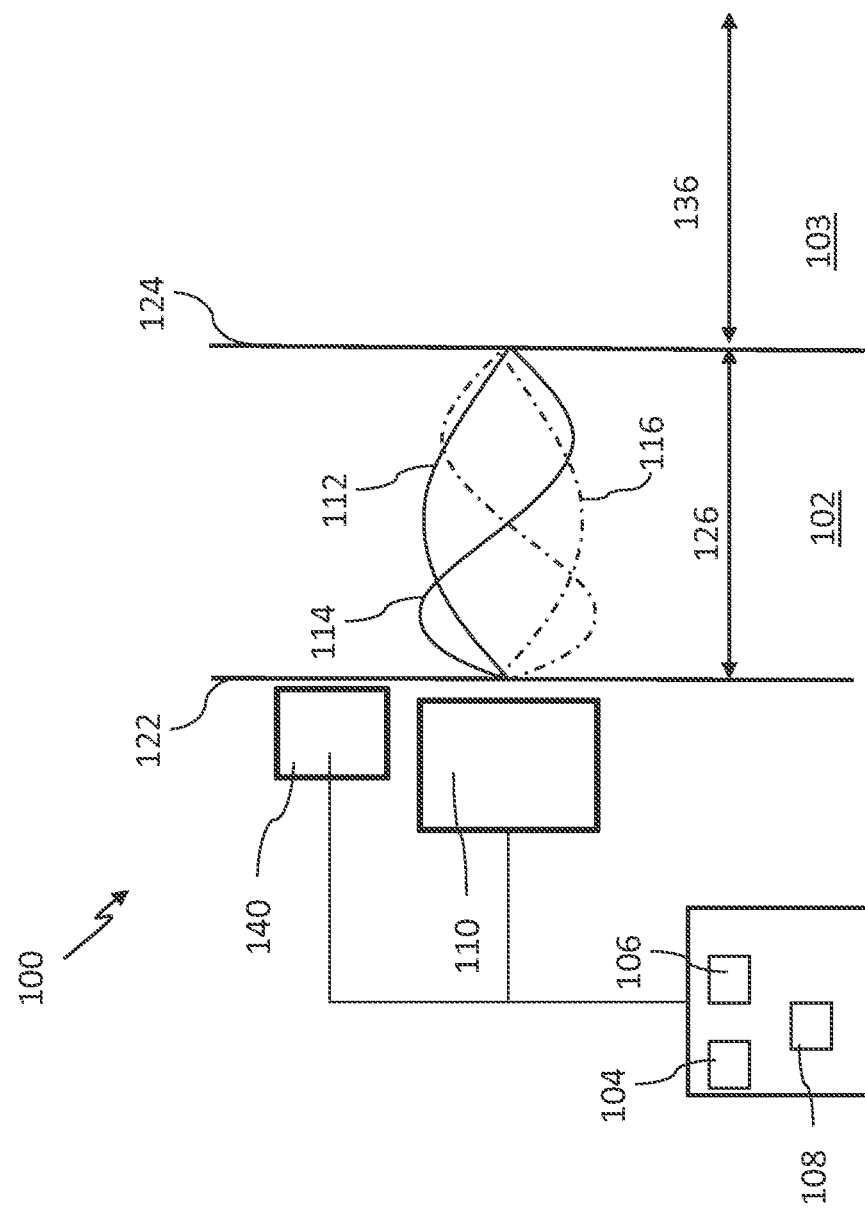
FIG. 1 is a cross-sectional diagrammatic illustration of an apparatus for measuring temperature in a layered environment, in accordance with a first exemplary embodiment of the present disclosure.

FIG. 1 is a cross-sectional diagrammatic illustration of an apparatus for measuring temperature in a layered environment ("apparatus") 100, in accordance with a first exemplary embodiment of the present disclosure. The apparatus 100 includes an ultrasound transducer 110 positioned perpendicular to an exterior surface 122 of a first layer 102. The ultrasound transducer 110 is in communication with a computer processor, power source, and computer-readable memory (not shown). The processor is configured to: measure a thickness 126 of the first layer 102; measure an exterior surface temperature of the first layer 102; calculate an impedance of the first layer 102 based on the thickness 126 and the exterior surface temperature; and calculate an interior surface temperature of the first layer 102 based on the impedance and the exterior surface temperature of the first layer 102.

The ultrasound transducer 110 may be any suitable transducer operating in the ultrasonic frequency range. In one example, the ultrasound transducer 110 may emit and receive ultrasound signals 112, 114, 116. The ultrasound transducer 110 may be in communication with a computer processor 104, power source 106, and computer-readable memory 108, as is known in the art. The power source 106 may provide power to the ultrasound transducer 110 and the processor 104. The computer processor 104 may control the ultrasound transducer 110 to operate by emitting an ultrasound signal 112, 114 or receiving an ultrasound signal 116. The received ultrasound signal 116 may be received by the processor 104 and stored within the computer-readable memory 108.

The ultrasound transducer 110 may be positioned substantially perpendicular to an exterior surface 122 of a first layer 102. In one example, the first layer 102 may be a pipe or container wall, for instance, made from cast iron or any other suitable material. The wall may surround and contain an amount of solid, semi-solid, liquid, or gas, which may create a second layer 103. The ultrasound transducer 110 may emit an ultrasound signal 112, 114 into the first layer 102 through the exterior surface 122 and the interior surface 124. The ultrasound signal 112, 114 may be used to perform a number of measurements of the first and second layers 102, 103.

Matter in any state (solid, liquid and gas) expands when heated. The atoms themselves do not expand, but the volume in which they exist expands. When a solid is heated, its atoms vibrate faster about their fixed points. The relative increase in the size of solids when heated is small in comparison with liquids and gasses. However, gases and liquids that are contained in a fixed volume cannot expand— and so increases in temperature result in increases in pressure. Air temperature can be determined from the speed of an ultrasonic wave using the following equation:

$$C=331+0.6*T$$

where T (in kg/m$^3$) is the temperature of the air, C (in m/s) is the speed of the ultrasound wave, and 331 is the constant speed of sound in air at freezing temperatures. The speed of sound is affected by other factors such as humidity and air pressure. Temperature is also a condition that affects the speed of sound. Heat, like sound, is a form of kinetic energy. Molecules at higher temperatures have more energy, thus they can vibrate faster. Since the molecules vibrate faster, sound waves can travel more quickly. The speed of sound in room temperature air is 346 meters per second. This is faster than 331 meters per second. When a liquid freezes or melts, the temperature stays the same even though heat energy is still being released to the surroundings. Therefore, as an example, the process of precipitation or melting of paraffin wax does not affect the temperature of crude oil in a pipeline. In solids, a major part of acoustic energy is dissipated from the ultrasound wave due to heat.

Acoustic velocity can be determined by the following equation:

$$C=\sqrt{(E/d)}$$

where d (in kg/m$^3$) is the density of a material, C (in m/s) is speed of the ultrasound wave, and E (in Pa, N/m$^2$) is the Bulk Modulus of Elasticity.

In a layered environment, the temperature can be measured at the beginning of each layer in combination with properties of the material in each layer. In one example, the number of layers may be used in determining the temperature of each layer. The number of layers may be determined by any suitable method, including acoustic detection, laser measurements, knowing the material composition previously, and the others.

In one example, the processor may be configured to control the transducer 110 to create one or more ultrasound signals 112, 114. A first ultrasound signal 112 may be used to determine the thickness of any layers 102, 103. It should be understood that two layers 102, 103 are shown for illustration; however, the systems and methods described herein may be used to determine the temperature and other characteristics of any number of layers, and are not limited by way of example. The first ultrasound signal 112, 114 may include ultrasonic waves of varying wavelengths. In one example, the wavelength may be tuned across the ultrasonic spectrum until a half-wavelength 112 or multiple of a half-wavelength 114 signal corresponds to the thickness 126 of the first layer. This may cause a standing wave to be established within the first layer 102, producing resonance. The ultrasound signal 112, 114 may resonate for frequencies that have half wavelengths in multiples of its thickness 126. An emitted ultrasound signal 112 may reflect off of the interior surface 124 of the first layer 102 and the reflected ultrasound signal 116 may be received by the ultrasound transducer 110. Furthermore, higher-level harmonic resonance may be used to determine thickness 126 with greater accuracy. The thickness 126 of the first layer 102 may be determined from the wavelength of any signals creating resonance and the speed of the ultrasonic wave within the first layer 102. The first ultrasound signal 112, 114 may be repeated in order to determine the thickness 136 of any subsequent layers, for instance, if a pipe wall comprises multiple coatings or layers. Each layer may resonate at specific frequencies that are indicative of the layer thickness. Emitted signals 112, 114 may be reflected and received as reflected signals 116 by the ultrasound transducer 110 in each case. All layers that are of the same size may resonate at the same frequencies, and their responses may be separated using the signal delay.

It should be noted that FIG. 1 is a diagrammatic illustration intended to show the principle of operation of the apparatus 100. Accordingly, the ultrasound signals 112, 114 and return signal 116 are illustrated as transverse waves, rather than longitudinal waves for clarity. It should be understood that the illustrated transverse waves are offered as an example to show partial-wavelength and multiple-wavelength frequencies propagating through the first layer 102, and do not indicate a transverse modulation in amplitude. One of skill in the art will understand that the ultrasonic waves 112, 114 described herein oscillate in a longitudinal direction.

It should be noted that the thickness 126 of the first layer 102 may be known from the manufacturer's specification, for instance, in the case of pipes. However, it is possible that corrosion or other forces may have caused deterioration of the first layer 102 in one or more places, and assuming the thickness 126 from a specification may not be accurate. Therefore, it may be necessary to measure the thickness 126 of the first layer using the acoustic resonance method described herein in order to accurately determine the temperature and other characteristics of other materials within the first layer 102.

The processor may next be configured to measure an exterior surface temperature of the first layer 102. The exterior surface temperature may be determined from the formulas provided above, based on the speed of the returned wave detected by the ultrasound transducer 110. In another example, one or more exterior temperature sensors 140 may be used. Next, the processor may be configured to calculate an impedance of the first layer 102 based on the thickness 126 and the exterior surface temperature. This may be done by measuring the reflected energy from the exterior surface 122 of the first layer 102 and factoring the measured value with the material density of the first layer 102, which may be known from the manufacturer's specifications.

Next, the processor may be configured to calculate an interior surface temperature of the first layer 102 based on the impedance and the exterior surface temperature of the first layer 102. This may be performed by measuring a time difference between a first echo or harmonic resonant reading detected by the ultrasound transducer 110 and a second echo detected by the ultrasound transducer 110. The time delay may allow the temperature of the interior surface 124 of the first layer 102 to be determined according to the following formula:

$$T_i = 2*T_w - T_o$$

where $T_i$ is the temperature of the interior surface 124, $T_w$ is the temperature of the exterior surface 122, and $T_o$ is the ambient temperature.

Next, the processor may be configured to measure the amplitude of a return signal 116. By measuring the amplitude of the return signal 116, the attenuation of the signal may be determined. This may allow the processor to determine the location and impedance of the second layer 103, which may be understood from the following equation:

$$R = \left[\frac{(Z_{2L} - Z_{1L})}{(Z_{2L} + Z_{1L})}\right]^2$$

Where R is the reflection coefficient, $Z_{2L}$ is the impedance of the second layer 103, and $Z_{1L}$ is the impedance of the first layer 102. R, the reflection of coefficient, is a fraction with a value less than 1. When R is multiplied by 100, it represents the percentage of the reflected energy from impedance barrier between two materials.

It should be noted that attenuation and speed of the signal are unrelated. Overall attenuation is increased when frequency increases or path length increases. The intensity of an ultrasonic beam that is sensed by a receiving transducer is considerably less than the intensity of the initial transmission. Scattering of ultrasonic waves is one of the major factors responsible for loss of beam intensity, and it is occurring because the material in which the ultrasonic wave is travelling is not homogeneous. The inhomogeneity may be anything that will present a boundary between two materials of different acoustic impedance such as an inclusion or pores and possibly grain boundaries containing contaminants. Certain materials are inherently inhomogeneous, such as cast iron and paraffin wax, which are composed of a matrix of grains and graphite particles (in the case of cast iron) which differ greatly in density and elasticity. Each grain in the agglomeration has radically different acoustic impedance and consequently produces severe scattering. It is possible to encounter scattering in a material of just one crystal type if the crystals exhibit velocities of different values when measured along axes in different directions. A material of this type is said to be anisotropic. If individual grains are randomly oriented throughout a material, scattering will occur as if the material is composed of different types of crystals or phases. Materials exhibiting these qualities not only decrease the returned ultrasound signal because of scattering, but also often produce numerous small echoes which may mask or "camouflage" real indications.

Absorption of ultrasonic waves is the result of the conversion of a portion of the sound energy into heat. In any material not at absolute zero temperature the particles are in random motion as a result of the heat content of the material. As the temperature increases, there will be an increase in particle activity. As an ultrasound wave propagates through the material it excites the particles. As these particles collide with unexcited particles, energy is transmitted causing them to oscillate faster and through larger distances. This motion persists after the sound wave has passed on, so energy of the passing wave has been converted to heat in the material.

Figure 2:
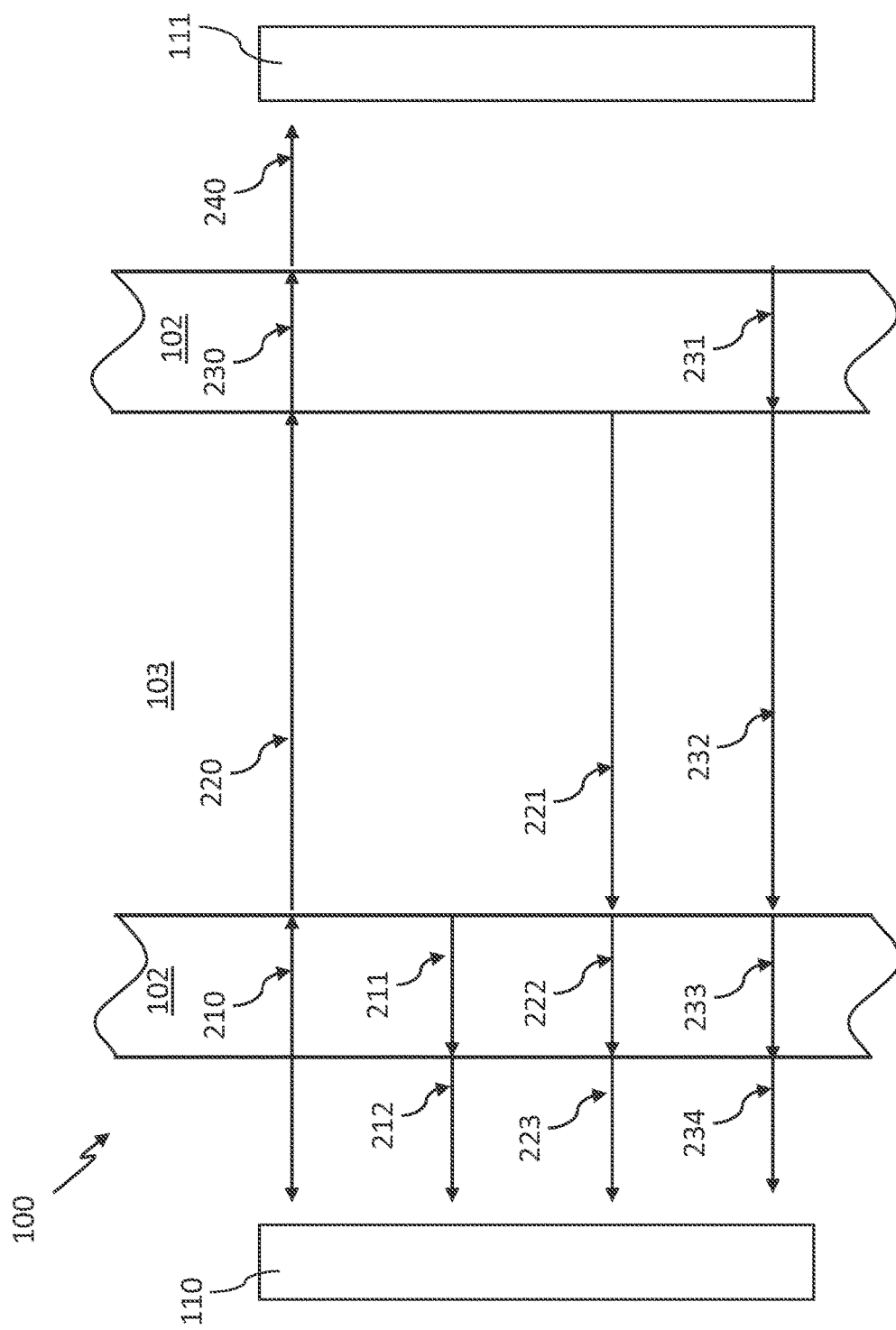
FIG. 2 is a diagrammatic illustration of the apparatus in operation, in accordance with the first exemplary embodiment of the present disclosure.

FIG. 2 is a diagrammatic illustration of the apparatus 100 in operation, in accordance with the first exemplary embodiment of the present disclosure. FIG. 2 illustrates the propagation of ultrasound signals through the first layer 102, second layer 103, and first layer (for instance, when the first layer 102 is a round pipe). One or more ultrasound transducers 110, 111 may be used to send and receive the signals as described relative to FIG. 1, above. FIG. 2 may further be understood relative to FIG. 1. Surfaces of the first and second layers 102, 103 have not been labeled to simplify the illustration.

In one example, a plurality of signals 210, 220, 230, 240 may result in a plurality of return signals or echoes 211, 212, 221-223, 231-234. Each echo 211, 212, 221-223, 231-234 may be useful in determining a property of the layers 102, 103 or the ambient environment. As can be seen from FIG. 2, signals 210, 220, 230, 240 may travel from a first ultrasound transducer 110 through the first layer 102, second layer 103, first layer 102, and into a second ultrasound transducer 111. At the boundary between each layer, the signals may reflect and/or propagate further. For example, a signal 210 traveling from the first ultrasound transducer 110 through the first layer 102 may reach the boundary between first and second layers 102, 103. The signal 210 may return toward the first ultrasound transducer 110 as echoes 211, 212. The signal 210 may continue as signal 220 through the second layer 103. When signal 220 reaches the boundary between the second layer and first layer 103, 102, the signal 220 may return toward the first ultrasound transducer 110 as echoes 221, 222, 223, each delineated by the boundaries between adjacent layers. The signal 220 may continue through the first layer 102 as signal 230. When signal 230 reaches the boundary between the first layer 102 and the second ultrasound transducer 111, it may return toward the first ultrasound transducer 110 as echoes 231, 232, 233, 234, each delineated by the boundaries between adjacent layers. Signal 230 may continue to the second ultrasound transducer 111 and be received and detected. Echoes 211, 212, 221-223, 231-234 may be received and detected by the first ultrasound transducer 110

TABLE 1

| | Layer Type Surface | | |
|---|---|---|---|
| | Transducer | Cast Iron | Fluid |
| | $Z_0$ | $Z_1$ $Z_1$ | $Z_2$ |
| Time | $t_0$ | $dt$ $t_1$ $dt_2$ | $dt_3$ $dt_4$ $dt_5$ |
| Attenuation | 100% | 99% 98% 10% | 9% 8% 7% |
| | 86% | 87% 88% | |

| | Layer Type Surface | | |
|---|---|---|---|
| | Fluid | Cast Iron | Transducer |
| | $Z_2$ | $Z_1$ $Z_1$ | $Z_0$ |
| Time | $dt_5$ $dt_4$ $dt_3$ $dt_2$ | $t_1$ $dt$ | $t_0$ |
| Attenuation | 7% 6% 5% 5% | 0.50% | 0.05% |

As can further be seen from FIG. 2 and Table 1, above, the attenuation of the signal degrades significantly as the signal passes through the first and second layers 102, 103, in this example, cast iron and fluid layers, respectively. Passing through the first layer 102 initially, the signal has a 99% and 98% attenuation. Passing through the second layer 103, the signal degrades from 10% to 5% attenuation in relatively linear steps. Passing through the final first layer 102, the signal degrades to about 0.5% attenuation.

Figure 3A:
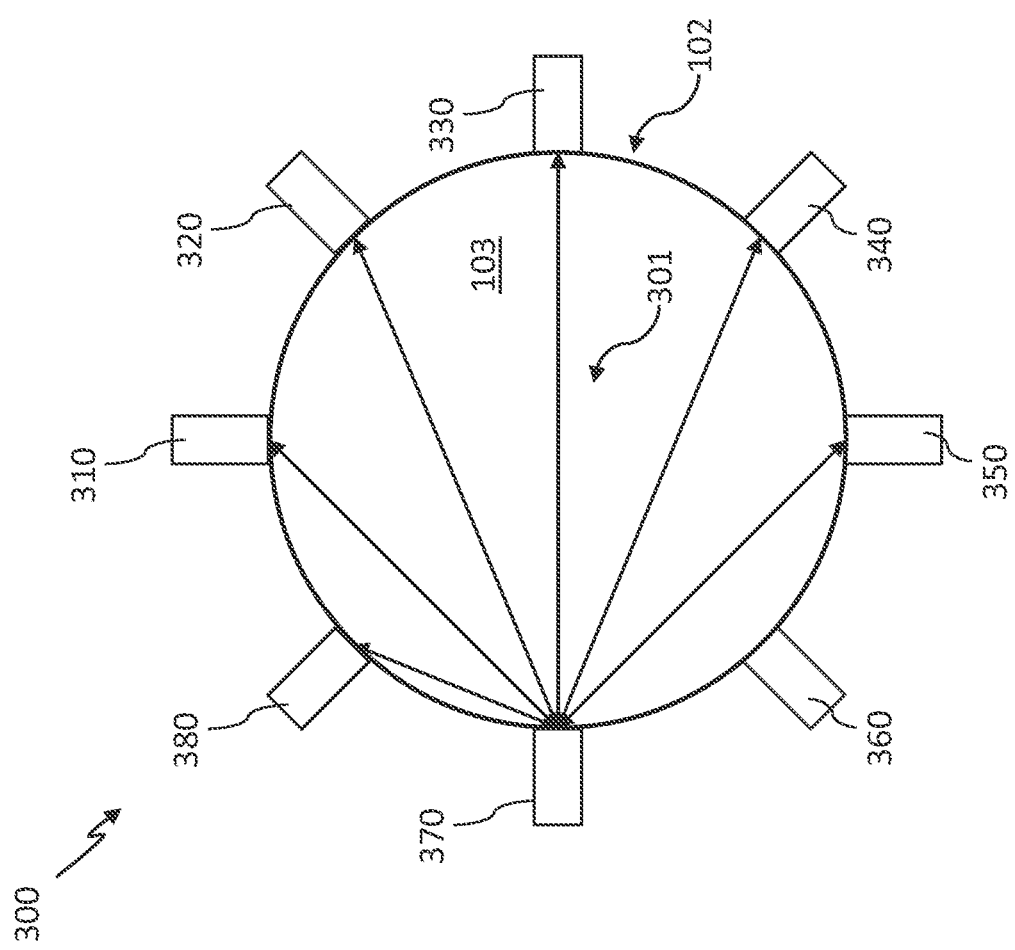
FIGS. 3A-3B are cross-sectional illustrations of a system for measuring temperature in a layered environment, in accordance with the first exemplary embodiment of the present disclosure.
Figure 3B:
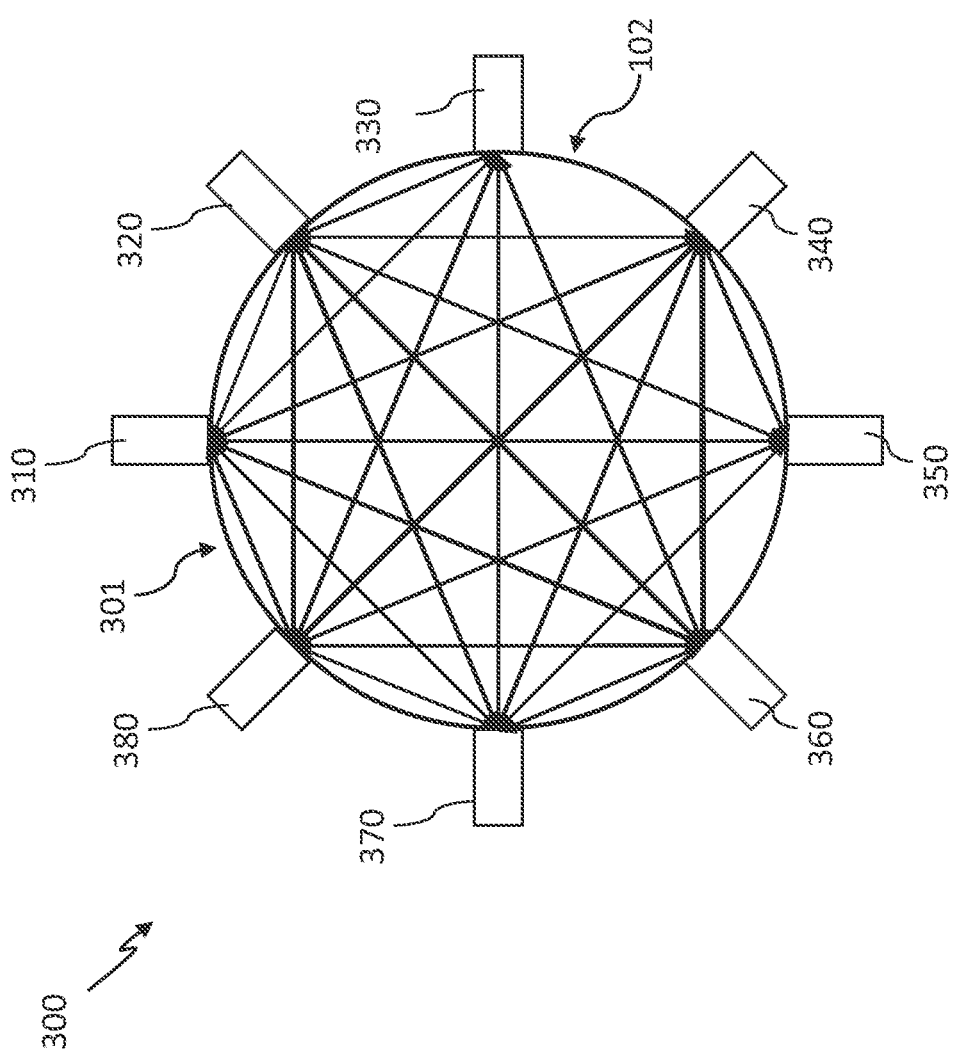

FIGS. 3A-3B are cross-sectional illustrations of a system for measuring temperature in a layered environment ("system") 300, in accordance with the first exemplary embodiment of the present disclosure. FIGS. 3A-3B show a plurality of ultrasound transducers 310-380 positioned perpendicular to a first layer 102, such as a pipe. The ultrasound transducers 310-380 may be in communication with at least one processor, power supply, and computer-readable memory as described above (not shown). The ultrasound transducers 310-380 are each located at a different position around the first layer 102. For example, the ultrasound transducers 310-380 may encircle the first layer 102 with a transducer located along each of a number of even divisions around the first layer 102, such that the ultrasound transducers 310-380 are separated about the exterior surface of the first layer 102 by even intervals. In another example, the ultrasound transducers 310-380 may be movable to different positions about the first layer 102. In one example, each transducer may be positioned directly opposite another transducer about the exterior surface of the first layer 102. For instance, ultrasound transducer 310 may be positioned opposite ultrasound transducer 350, and ultrasound transducers 320 and 360 may be positioned opposite one another, and so on. In another example, the ultrasound transducers 310-380 may be movable to be located opposite one another, or at any other suitable position relative to one another.

FIG. 3A shows that one ultrasound transducer 370 may emit ultrasound signals 301 to any number of the other ultrasound transducers 310-360, 380. The ultrasound signals 301 may be received by the other ultrasound transducers 310-360, 380 and processed to determine characteristics of the first layer 102 and the second layer 103, such as the layer thickness, exterior surface temperature, material impedance, interior surface temperature, and second layer temperature. This may be performed as described above. In one example, each ultrasound signal 301 emitted by an ultrasound transducer 310-380 may be reflected and received by the ultrasound transducer from which it originated to determine local material characteristics.

FIG. 3B illustrates that each ultrasound transducer 310-380 may emit ultrasound signals 301 to each other ultrasound transducer 310-380. The received ultrasound signals 301 may be processed to determine the desired characteristics of the first and second layers 102, 103. When a plurality of ultrasound transducers 310-380 are used, the system 300 may process the ultrasound signals 301 to determine a plurality of temperature gradients of the second layer 103. For instance, a temperature measured between transducers 310 and 350 may differ from the temperatures measured between transducers 320 and 360, 330 and 370, 340 and 380, and so on. This may be indicative of a local temperature nearer to a particular ultrasound transducer 310-380, as the temperature of the second layer 103 may not be even at all points within the second layer 103. Therefore, temperature values calculated between each ultrasound transducer 310-380 and each other ultrasound transducer 310-380 may correlate with local temperatures that gradually change throughout a cross-sectional area of the second layer 103. The processor may use these multiple temperature measurements to determine one or more temperature gradients within the second layer 103. In general, it is expected that the temperature at the center of the second layer 103 is higher than the temperature at the interior edge of the first layer 102.

With respect to FIGS. 1-3B, measurements may be performed at any suitable intervals. In one example, the ambient temperature may be monitored for changes, which may cause measurements to be performed again. In another example, data may be regularly sampled and the measurements performed again.

Additionally, ultrasonic tomographic imaging may be used to further map the temperature field within the first and second layers 102, 103. Tomographic imaging allows spatial variations of a physical variable in a material to be determined using only measurements made at the periphery of the area of interest. Ultrasonic waves may be propagated through the material in multiple directions, and a cross-sectional image may be reconstructed.

Resonant ultrasound spectroscopy may be employed using normal modes of elastic bodies to infer material properties such as elastic moduli and Q.

FIG. 4 is a flowchart 400 illustrating a method of measuring a temperature in a layered environment, in accordance with the first exemplary embodiment of the present disclosure.

It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

Step 410 includes measuring a thickness of a first layer in at least one position. In one example, measuring the thickness of the first layer may include emitting, with an ultrasound transducer, an ultrasound signal between the exterior surface of the first layer and an interior surface of the first layer; and receiving, with the ultrasound transducer, the ultrasound signal reflected by the interior surface of the first layer. The ultrasound transducer may be selected, positioned, and operated as described above relative to FIG. 1. In one example, the ultrasound signal emitted by the ultrasound transducer may have a half-wavelength corresponding to the thickness of the first layer. This may cause a standing wave within the first layer, leading to resonance of the ultrasound signal within the first layer.

Step 420 includes measuring a surface temperature of an exterior surface of the first layer at the at least one position. In one example, measuring the surface temperature of the exterior surface may include determining, with the ultrasound transducer, a speed of the ultrasound signal; and correlating the speed of the ultrasound signal with a constant speed of sound in air at freezing temperatures. The speed of the ultrasound signal may be determined by analyzing the time required for the ultrasound transducer to receive a reflected signal after first emitting an ultrasound signal. This may be correlated with other material properties of the first layer and the determined thickness of the first layer in order to determine the distance traveled by the emitted and returned signals within the measured time.

Step 430 includes calculating an impedance of the first layer at the at least one position based on the thickness and the exterior surface temperature at the at least one position. In one example, calculating the impedance of the first layer may include measuring an energy of the reflected ultrasound signal; and factoring the measured energy with a material density value of the first layer.

Step 440 includes calculating an interior surface temperature of the first layer at the at least one position based on the impedance and the exterior surface temperature at the at least one position.

Step 450 includes determining at least one temperature gradient of a second layer in contact with the first layer.

The method may further include any other features, components, or functions disclosed relative to any other figure of this disclosure.

Figure 5:
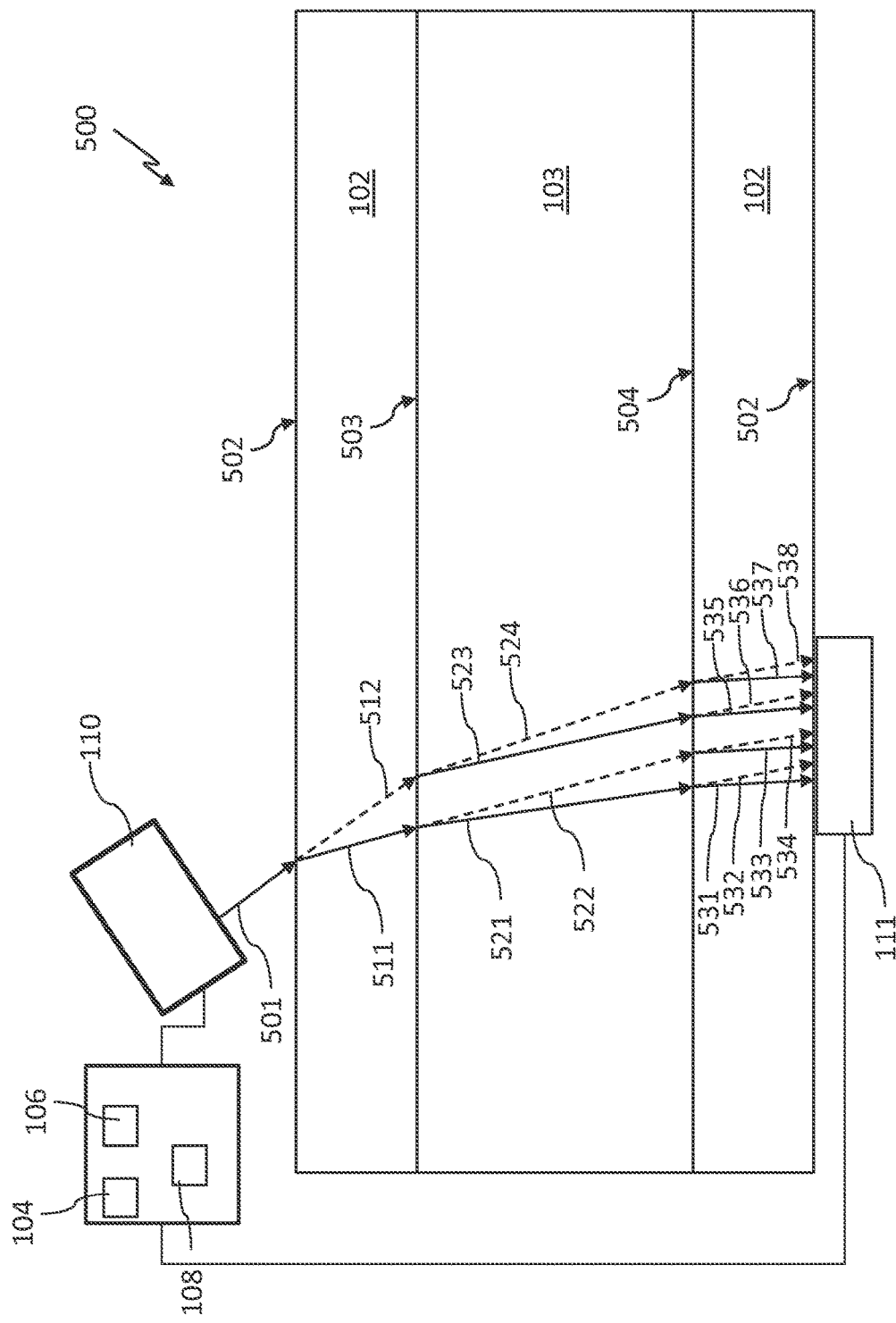
FIG. 5 is a cross-sectional diagrammatic illustration of a system for measuring a number of layers in a layered environment, in accordance with a second exemplary embodiment of the present disclosure.
Figure 6:
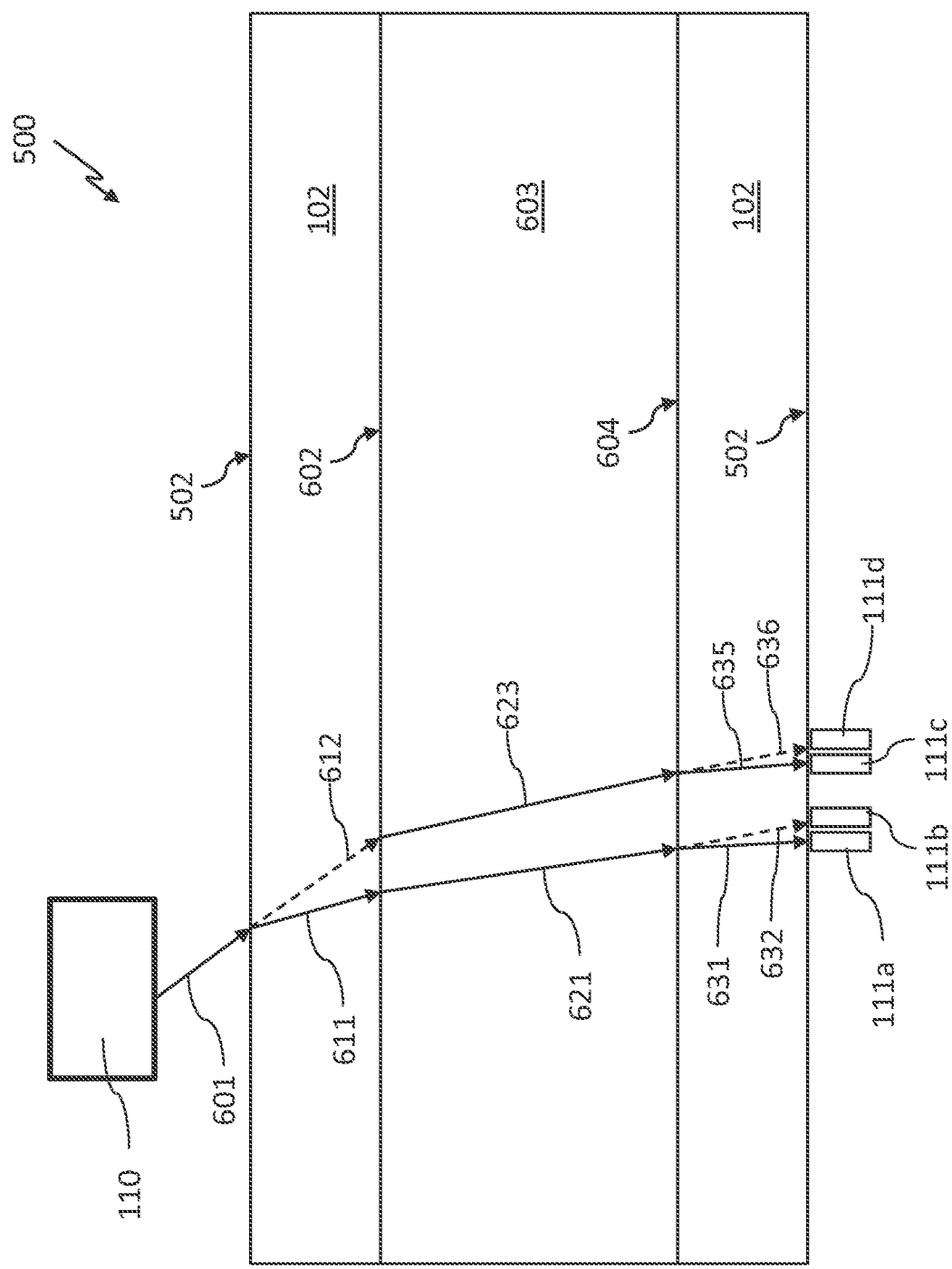
FIG. 6 is a cross-sectional diagrammatic illustration of the system measuring a number of layers in a layered environment with a liquid material, in accordance with the second exemplary embodiment of the present disclosure.

FIG. 5 is a cross-sectional diagrammatic illustration of a system for measuring a number of layers in a layered environment 500, in accordance with a second exemplary embodiment of the present disclosure. The view illustrated in FIG. 5 is an exemplary cross-sectional view showing a round pipe 102 having a material 103 therein. It should be understood that FIGS. 5-6 are diagrammatic illustrations, and the angles and spacings shown are given as illustrative examples. Components, positions, and orientations may not be shown to scale.

The system for measuring a number of layers in a layered environment ("system") 500 includes an ultrasound transducer 110 positioned at an exterior surface 502 of a first layer 102 at a first location. At least one receiving sensor 111 is positioned perpendicular to the exterior surface 502 of the first layer 102 at a second location. The ultrasound transducer 110 and the at least one receiving sensor 111 are in communication with a computer processor 104, power source 106, and computer-readable memory 108. The ultrasound transducer 110 is configured to emit a first ultrasound signal 501 into the first layer 102 at the first location. The at least one receiving sensor 111 is configured to receive a plurality of propagated ultrasound signals 531-538. The processor 104 is configured to determine a total number of layers in the layered environment based on at least one from the set of: a number of signals received and a number of propagation direction changes only of the first ultrasound signal.

The ultrasound transducer 110 may be any suitable ultrasound transducer as described relative to FIGS. 1-4, above. In one example, the ultrasound transducer 110 may be positioned non-perpendicular to the first layer 102 in order to emit a first ultrasound signal 501 that propagates non-perpendicular to the first layer 102. In another example, the ultrasound transducer 110 may be oriented perpendicular with the first layer 102, but the angle of propagation of the first ultrasound signal 501 may be non-perpendicular to the first layer 102. Within the subject disclosure, "non-perpendicular" may be understood to mean propagating at an angle other than the normal angle with respect to the exterior surface 502 of the first layer 102, i.e., an angle other than 90° straight on. A first ultrasound signal 501 propagating at a non-perpendicular angle may reach the exterior surface 502, where there is a change in the impedance between the ambient environment and the first layer 102. Upon interacting with the exterior surface 502, the first ultrasound signal 501 may generate a longitudinal wave 511 and a shear wave 512 that may propagate through the first layer 102. The longitudinal wave 511 and shear wave 512 may both propagate through the first layer 102 at angles different from the first ultrasound signal 501, and may continue until they reach an impedance barrier 503 between the first layer 102 and the second layer 103.

Depending on the nature of the layers 102, 103, the longitudinal and shear waves 511, 512 may generate additional longitudinal and/or shear waves at each new impedance barrier. FIG. 5 illustrates the process of wave generation when the first layer 102 is a solid material and the second layer 103 is also a solid material. In this case, the longitudinal wave 511 may reach the impedance barrier 503 between the first and second layers 102, 103, generating longitudinal wave 521 and shear wave 522. The shear wave 512 may generate longitudinal wave 523 and shear wave 524 at the impedance barrier 503. Likewise, each of these waves 521-524 may reach the impedance barrier 504 between the second layer 103 and the first layer 102 and may each generate additional longitudinal and shear waves 531-538. Each newly-generated wave 511-538 may have a different propagation angle than the wave from which it was generated.

It should be understood that this wave generation process may operate for any number of layers within the layered environment, and that the first and second layers 102, 103 are given merely as examples.

At least one receiving sensor 111 may be positioned perpendicular to the exterior surface 502 of the first layer 102 at a second location. The at least one receiving sensor 111 may be any suitable sensor capable of receiving longitudinal and shear ultrasound waves propagating through a medium. In one example, the at least one receiving sensor 111 may be a laser-based sensor which may, for example, use a laser to detect movement in the first layer 102. The at least one receiving sensor 111 may be capable of receiving all of the ultrasound signals 531-538 propagating through the first layer 102. In one example, the at least one receiving sensor 111 may be a single sensor with a wide detection area spanning across the width of all of the ultrasound signals 531-538. In another example, the at least one receiving sensor 111 may be movable to receive each of the ultrasound signals 531-538 as they arrive at the sensor plane. In another example, the system 500 may include a plurality of sensors, such as a sensor array. This is shown in FIG. 6, below.

The ultrasound transducer 110 and the at least one receiving sensor 111 may be in communication with a computer processor 104, power source 106, and computer-readable memory 108. The ultrasound transducer 110 is configured to emit a first ultrasound signal 501 into the first layer 102 at the first location. The at least one receiving sensor 111 is configured to receive the plurality of propagated ultrasound signals 531-538. The processor 104 is configured to determine a total number of layers in the layered environment based on at least one from the set of: a number of signals received and a propagation direction of the plurality of propagated ultrasound signals. In one example, the processor 104 may detect the number of signals incident upon the at least one receiving sensor 111. The processor 104 may apply an algorithm to the number of incident signals to determine the number of layers and/or the number of impedance barriers through which the first ultrasound wave 501 has passed. For instance, this may be determined by the equations:

$$N_L = \log(N_S, 2);$$

$$N_{IB} = N_L - 1, \text{ or } N_{IB} = \log(N_S, 2) - 1;$$

where $N_L$ is the number of layers, $N_{IB}$ is the number of impedance barriers, and $N_S$ is the number of signals detected.

In the example shown in FIG. 5, $N_L$ would be calculated as log(8,2), or 3. $N_{IB}$ would be calculated as 3−1, or 2. Thus it would be determined that there were three layers 102, 103, 102 and/or two impedance barriers 503, 504 through which the first ultrasound wave 501 travelled.

The number of layers and/or the number of impedance barriers may be used as factors in determining the thickness, temperature, and other characteristics of each layer, as detailed above.

FIG. 6 is a cross-sectional diagrammatic illustration of the system for measuring a number of layers in a layered environment 500 with a liquid material 603, in accordance with the second exemplary embodiment of the present disclosure. The ultrasound transducer 110 and the at least one receiving sensor 111a-111d are shown as discussed relative to FIG. 5. The computer processor, power source, and computer-readable memory are not shown for simplicity in illustration, but should be understood to be included in operation with the system 500.

In the example shown in FIG. 6, the at least one receiving sensor is shown as a sensor array having a plurality of sensors 111a-111d. In operation, the sensor array may include any number and arrangement of sensors 111a-111d. For example, the sensor array may include a plurality of sensors along a single axis. In another example, the plurality of sensors may be arranged in a two-dimensional array across two axes. In one example, the sensor array may include a number of sensors that is a multiple of a power of two, such as 2, 4, 8, 16, and so on. In one example, one or more sensors 111a, 111c may be configured to receive longitudinal wave signals 631, 635, while one or more sensors 111b, 111d may be configured to receive shear wave signals 632, 636. The sensors 111a-111d may receive ultrasound signals 631-636 that have propagated through the layered environment.

The example in FIG. 6 also shows a layered environment comprising a fluid or liquid material 603. Signal generation between the impedance barriers may differ in solid-to-liquid changes compared with solid-to-solid or liquid-to-liquid changes. For example, the ultrasound transducer 110 may be configured to emit a first ultrasound signal 601 at a non-perpendicular angle with respect to the exterior surface 502 of the first layer 102. The first layer 102 is shown as a solid layer (such as a pipe material). At the impedance barrier of the exterior surface 502, the first ultrasound signal 601 may generate a longitudinal wave 611 and a shear wave 612, which may propagate at angles different from one another and different from the first ultrasound signal 601. Upon reaching the impedance barrier 602 between the first layer 102 and the second layer 603, the longitudinal and shear waves 611, 612 may generate longitudinal waves 621, 623 each propagating at different angles than the longitudinal and shear waves 611, 612. This may be due to the properties of the solid-to-liquid impedance barrier 602. These waves 621, 623 may propagate through the liquid layer 603 and reach the impedance barrier 604 between the liquid layer 603 and first layer 102, which may be a liquid-to-solid change. These longitudinal waves 621, 623 may generate longitudinal waves 631, 635 and shear waves 632, 636 that propagate at angles different from each other and from the longitudinal waves 621, 623 through the first layer 102. Upon reaching the exterior surface 502 of the first layer, the waves 631-636 may be received by the at least one receiving sensor 111a-111d.

In a scenario with liquid and solid materials, the total number of layers can be determined as the base 2 logarithm of the number of signals detected, plus the number of times that only the propagation direction of the signal was changed. For the example shown in FIG. 6, four signals 631, 632, 635, 636 would be detected, giving a result of log(4, 2)=2, while the number of propagation direction changes only would be 1, giving a result of 2+1=3 layers or impedance barriers 502, 602, 604.

With respect to FIGS. 5 and 6, it should be understood that each signal may generate a reflected signal (not shown) at each impedance barrier. Within the layered environment, reflected signals may encounter impedance barriers and may themselves be reflected back toward the at least one receiving sensor 111, 111a-111d. Detection of these reflected signals may provide improved measurement accuracy in the system 500's measurements.

Figure 7:
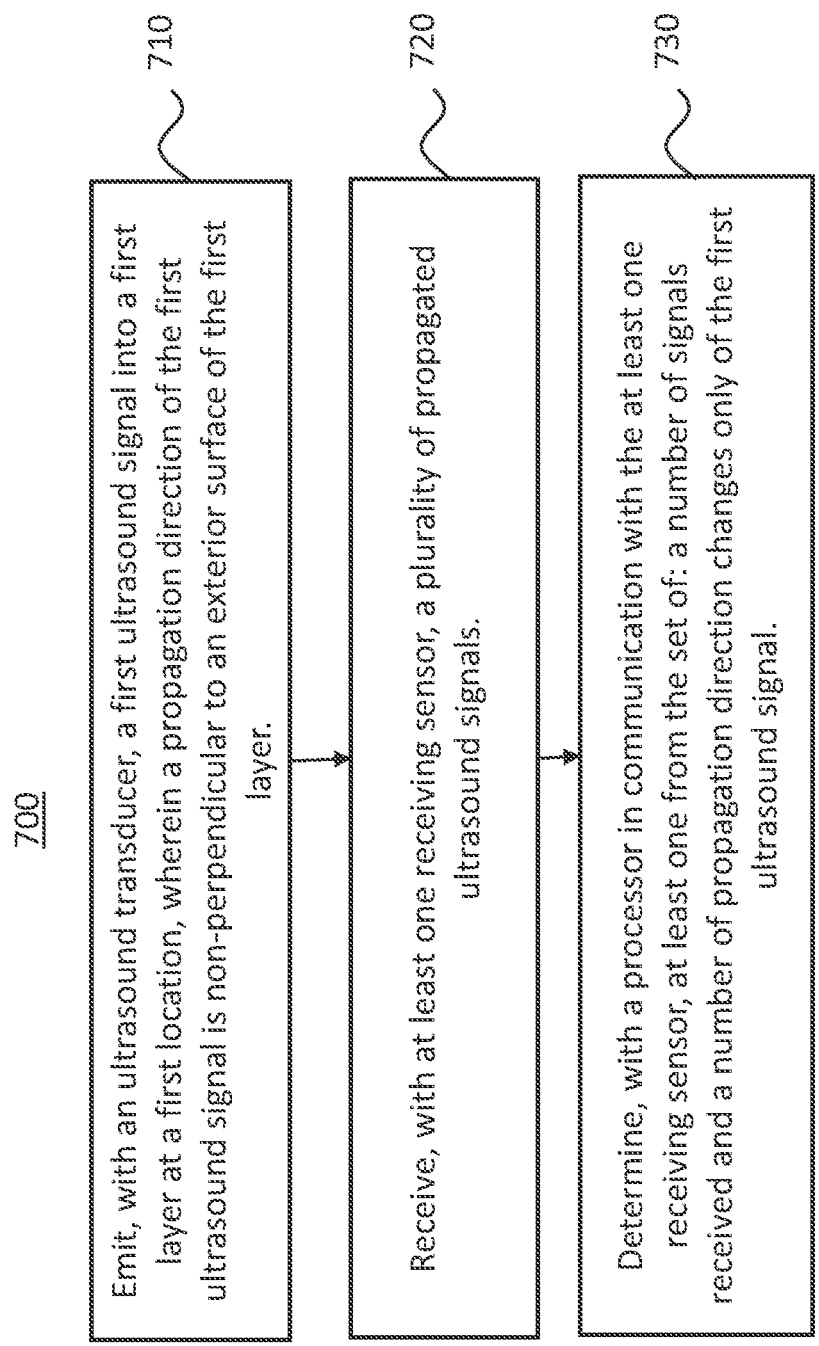
FIG. 7 is a flowchart illustrating a method of measuring layers in a layered environment, in accordance with the second exemplary embodiment of the present disclosure.

FIG. 7 is a flowchart 700 illustrating a method of measuring layers in a layered environment, in accordance with the second exemplary embodiment of the present disclosure. The method may further include any other features, components, or functions disclosed relative to any other figure of this disclosure.

Step 710 includes emitting, with an ultrasound transducer, a first ultrasound signal into a first layer at a first location, wherein a propagation direction of the first ultrasound signal is non-perpendicular to an exterior surface of the first layer. In one example, a plurality of ultrasound signals may be emitted, one after another.

Step 720 includes receiving, with at least one receiving sensor, a plurality of propagated ultrasound signals.

Step 730 includes determining, with a processor in communication with the at least one receiving sensor, at least one from the set of: a number of signals received and a number of propagation direction changes only of the first ultrasound signal. In one example, the number of signals received may be used to indicate a total number of layers within the layered environment. The base 2 logarithm of the number of signals received may return the total number of layers. In an entirely solid material layered environment, the total number of layers minus one may return a number of impedance barriers within the layered environment. In a solid-andliquid material layered environment, the total number of layers plus the number of direction changes on of the first ultrasound signal may return the number of impedance barriers within the layered environment.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A system for measuring a number of layers in a layered environment, comprising:
    an ultrasound transducer positioned at an exterior surface of a first layer at a first location; and
    at least one receiving sensor positioned perpendicular to the exterior surface of the first layer at a second location, wherein the ultrasound transducer and the at least one receiving sensor are in communication with a computer processor, power source, and computer-readable memory, and wherein:
        the ultrasound transducer is configured to emit a first ultrasound signal into the first layer at the first location;
        the at least one receiving sensor is configured to receive a plurality of propagated ultrasound signals; and
        the processor is configured to determine a total number of layers in the layered environment based on at least one from the set of: a number of signals received and a number of propagation direction changes only of the first ultrasound signal, wherein the total number of layers is determined as the base 2 logarithm of the number of signals received.

2. The system of claim 1, wherein the ultrasound transducer is positioned non-perpendicular to the exterior surface of the first layer.

3. The system of claim 1, wherein the at least one receiving sensor is sized to receive all of the plurality of propagated ultrasound signals.

4. The system of claim 1, wherein the at least one receiving sensor is movable across a sensor plane to receive the plurality of propagated ultrasound signals.

5. The system of claim 1, wherein the at least one receiving sensor comprises a plurality of receiving sensors, each receiving sensor configured to receive a portion of the plurality of propagated ultrasound signals.

6. The system of claim 5, wherein the at least one receiving sensor is configured as a sensor array.

7. The system of claim 6, wherein the sensor array is configured along a single axis.

8. The system of claim 6, wherein the sensor array is configured along a two-dimensional plane.

9. The system of claim 1, wherein the processor is further configured to determine a number of impedance barriers through which the first ultrasound signal passed, and wherein the number of impedance barriers is determined as the total number of layers minus one.

10. The system of claim 1, wherein the processor is further configured to determine a number of impedance barriers through which the first ultrasound signal passed, and wherein the number of impedance barriers is determined as a sum of the base 2 logarithm of the number of signals received, plus the number of propagation direction changes only of the first ultrasound signal.

11. A method of measuring layers in a layered environment, comprising the following steps:
    emitting, with an ultrasound transducer, a first ultrasound signal into a first layer at a first location, wherein a propagation direction of the first ultrasound signal is non-perpendicular to an exterior surface of the first layer;
    receiving, with at least one receiving sensor, a plurality of propagated ultrasound signals; and
    determining, with a processor in communication with the at least one receiving sensor, a total number of layers in the layered environment based on the total number of layers within the layered environment as the base 2 logarithm of the number of signals received.

12. The method of claim 11, wherein the ultrasound transducer is positioned non-perpendicular to the exterior surface of the first layer.

13. The method of claim 11, wherein the at least one receiving sensor is sized to receive all of the plurality of propagated ultrasound signals.

14. The method of claim 11, wherein the at least one receiving sensor is movable across a sensor plane to receive the plurality of propagated ultrasound signals.

15. The method of claim 11, wherein the at least one receiving sensor comprises a plurality of receiving sensors, each receiving sensor configured to receive a portion of the plurality of propagated ultrasound signals.

16. The method of claim 15, wherein the at least one receiving sensor is configured as a sensor array.

17. The method of claim 12, further comprising the step of determining, with the processor, a number of impedance barriers within the layered environment as the total number of layers minus one.

18. The method of claim 12, further comprising the step of determining, with the processor, a number of impedance barriers through which the first ultrasound signal passed, and wherein the number of impedance barriers is determined as the base 2 logarithm of the number of signals received, plus the number of propagation direction changes only of the first ultrasound signal.

* * * * *